Patented Jan. 14, 1936

2,027,932

UNITED STATES PATENT OFFICE 2,027,932

MOLD AND METHOD FOR ITS PRODUCTION

Arthur B. Ray, Bayside, N. Y., assignor to Carbide and Carbon Chemicals Corporation, a corporation of New York No Drawing. Application January 20, 1934, Serial No. 707,543

32 Claims. (Cl. 22—188)

This invention relates to the casting of metal and has for its object the provision of refractory molds having surfaces which are relatively smooth, hard, strong and of such a nature that castings which are smooth and free from blowholes can readily be produced.

While the invention is of great utility in the preparation of sand molds, it is of especial importance in the formation of refractory molds of alumina, powdered silica and similar comminuted refractories, suitable for the casting of metals and alloys having high melting points. The molds produced by this invention can be used for casting stamping dies, forming molds, ornamental hardware and special articles from ordinary steel, stainless steel, "Stellite" and other high melting alloys. These castings as produced have smooth, sharply-defined surfaces, and require little or no machining, buffing or polishing.

It has been found that molds having these desirable properties can be produced by bonding suitable comminuted refractory materials by the use of solutions of suitable organic compounds of silicon that decompose and deposit an adherent film of silica which acts as the bonding agent. Moreover, molds prepared by the use of other bonding agents may be improved by impregnating them throughout or at least adjacent their molding surfaces with an organic compound of the nature described, such as an ester of silicic acid capable of depositing silica. The molds produced in this manner are porous but have a hard, smooth, refractory surface.

According to one modification of the present invention, the shaping surfaces of a sand mold are treated with a solution containing one or more esters of ortho-silicic acid, which esters decompose or hydrolyze when caused to react with water, and deposit an adherent film of silica on the shaping surfaces of the mold. According to another modification the comminuted refractory material is mixed with the silicic acid ester preparation, and the latter subsequently is decomposed to provide an adherent silica bonding agent for the refractory mass.

The esters of ortho-silicic acid that have been found to be particularly useful for this purpose are the monohydric alcohol silicates, such as tetra-methyl silicate, tetra-ethyl silicate and tetra-butyl silicate; the condensed monohydric alcohol silicates, such as methyl disilicate, methyl trisilicate, methyl tetra-silicate and ethyl disilicate; the polyhydric alcohol silicates, such as primary, secondary and tertiary glycerol silicates, and primary and secondary ethylene glycol silicates; and the condensed polyhydric alcohol silicates.

When a solution of a polyhydric alcohol silicate, such as secondary ethylene glycol silicate, is applied to the surfaces of molds of sand or of the usual comminuted refractory material and is caused to react with water, as will be hereinafter described, the silicate hydrolyzes to liberate ethylene glycol and to form an adherent film of silica. The liberation of a polyhydric alcohol, such as ethylene glycol, on the shaping surfaces of molds facilitates parting of the casting and the mold. When metals are cast in molds treated in this manner, it is probable that the ethylene glycol decomposes upon heating to form a thin gas blanket and to produce a fine layer of carbon or soot at the surfaces of the molds, which prevents the molding material from adhering to the casting.

When solutions of monohydric alcohol silicates are used to form an adherent film of silica on the shaping surfaces of molds, the monohydric alcohol, which is liberated upon hydrolysis of the silicate, volatilizes. In such cases, the deposit of silica alone is formed; and in order to facilitate good parting, the surfaces of the molds can be treated directly, when desired, with a polyhydric alcohol, such as a glycerol or a glycol or mixtures thereof.

The different types of esters of ortho-silicic acid mentioned above vary considerably with respect to their behavior to water. All of these silicates react with water, but at different rates; and, with the exception of the primary and secondary glycerol silicates and primary glycol silicate, it may be said that all of these silicates are relatively insoluble in water.

When it is desired to deposit an adherent film of silica by hydrolysis of a monohydric alcohol silicate or condensed silicate, it is usually necessary to use a common solvent for the silicate and water, such as ethanol, or methanol, or a mixture thereof, and to partially hydrolyze the silicate before application. The amount of water used is preferably less than the amount required for complete hydrolysis of all the silicate. In this manner, a uniform solution is obtained which will remain liquid for some time. Such solutions may be diluted by the addition of alcohol or other suitable solvent. The complete hydrolysis of such solution when used may be accelerated by adding a trace of acid, such as hydrochloric acid, or by adding a small amount of a basic material such as magnesium oxide to the refractory material.

When such a solution is applied to the surfaces of sand molds, the solvent evaporates, and colloidal silica present in the liquid coagulates to form a gel that deposits in the form of an adherent film between the particles of refractory at the surface of the molds. This gel contains liquid silicon ester which reacts with water taken from the sand or other refractory or from the air to form an additional adherent bonding film of silica in accordance with the equation (in which the hydrolysis of ethyl disilicate is shown for the purpose of illustration):

$$Si_2O(OC_2H_5)_6 + 3H_2O = 2SiO_2 + 6C_2H_5OH.$$

The partial hydrolysis of the monohydric alcohol silicates and condensed silicates before application is practically essential, because it is necessary to form colloidal silica containing liquid silicon ester in order to cause "setting" or forming of the gel that eventually hardens as a film on the surfaces of the mold when the solvent evaporates. The setting and hardening action probably is due to a spontaneous increasing transformation of the silicon ester into silica gel, and the gradual dehydration of the latter.

With the solution of the polyhydric alcohol silicates and condensed silicates, it is not necessary to partially hydrolyze them before they are applied to the surfaces of a mold. The polyhydric alcohol silicates, such as the glycerol and glycol silicates, may merely be dissolved in a volatile solvent, such as ethanol, and applied to the surfaces of sand or other molds. The solvent vaporizes, and the polyhydric alcohol silicates coagulate and "set" to form a gelatinous film between the sand grains. Because of the great hygroscopicity of the polyhydric alcohol silicates, they readily take up water from the air to liberate the polyhydric alcohol and to deposit an adherent film of silica in accordance with the equation (in which the hydrolysis of the secondary glycol silicate is shown for the purpose of illustration):

$$Si(O_2C_2H_4)_2 + 2H_2O = SiO_2 + 2C_2H_4(OH)_2.$$

In treating the surfaces of a mold with a solution of an ester or mixture of esters of ortho-silicic acid, the solution may be applied either by spraying or by brushing, dipping, or the like. As mentioned before, the deposited silica does not destroy the necessary permeability of the molding material, so that gases formed during a casting operation can readily flow through the molding material and escape.

Where such a surface treatment is employed, various solid fillers and bodying agents may be mixed with the solution of the ester of ortho-silicic acid for the purpose of decreasing the degree of penetration of the liquid into the body of material of the mold and, by maintaining a liquid surface film of substantial thickness, facilitating the formation of a mold having a smooth surface configuration upon subsequent decomposition of the ester.

Among such fillers and bodying agents found suitable for this purpose may be mentioned finely-pulverized silica, alumina, zirconia, and graphite, the particles preferably being of smaller size than 200-mesh.

Many esters of ortho-silicic acid may be prepared by causing silicon tetrachloride to react with the desired alcohol in accordance with the equation:

$$SiCl_4 + 4ROH = Si(OR)_4 + 4HCl,$$

where R represents the alkyl radical of the alcohol used.

Condensed monohydric alcohol ortho-silicates may be prepared by using alcohol containing water in the above described process or by adding the theoretical amount of water, diluted with alcohol, to the mono-silicate, and then refluxing the mixture.

The polyhydric alcohol silicates preferably are prepared by causing the polyhydric alcohol to react with an alkyl silicate in accordance with the equation:

$$4R(OH)_x + Si(OR')_4 = Si(OR(OH)_{x-1})_4 + 4R'OH,$$

to form the primary polyhydric alcohol silicate; or in accordance with the equation:

$$2R(OH)_x + Si(OR')_4 = Si(O_2R(OH)_{x-2})_2 + 4R'OH$$

to form the secondary polyhydric alcohol silicate. In the above equations, R and R' represent the alkyl radicals of the alcohols used, and $x$ represents the number of hydroxyl groups in the polyhydric alcohol.

The silicates formed from polyhydric alcohols are either very viscous liquids or amorphous solids. Thus, the primary glycerol and glycol silicates are viscous liquids when warm, and strongly gelatinous when cold; and the secondary glycol and secondary and tertiary glycerol silicates are amorphous solids. The polyhydric alcohol silicates in which all of the hydroxyls are esterified, such as the tertiary glycerol and secondary glycol silicates, are not readily soluble in water; and the polyhydric alcohol silicates in which only a part of the hydroxyls are esterified, such as the primary and secondary glycerol and primary glycol silicates, are soluble in water in all proportions.

Since the polyhydric alcohol silicates are either viscous liquids or amorphous solids, they must be dissolved in a solvent, such as alcohol, to be useful for depositing silica in an adherent form. In the preferred method of preparing polyhydric alcohol silicates, as described above, at least part of the alcohol formed may be utilized as the solvent, and the remainder distilled off from the solution formed. Such a solution having a specific gravity of approximately 1.115 at 25° C. which is capable of depositing approximately 24% of its weight of silica has been found to be particularly useful.

The following example of the practice of one modification of my invention is given for the purpose of illustration only. 200 grams of an intimate mixture of fused alumina ($Al_2O_3$), finer than 200 mesh, with .25% of its weight of magnesia (MgO) was mixed with 34 c. c. of a partially hydrolyzed condensed ethyl silicate solution, (sp. gr. 1.03, capable of depositing 32.6% of its weight of $SiO_2$), and 17 c. c. 80% ethanol. The resultant paste was placed upon a glue pattern held in a glue cup, agitated to remove air bubbles, and allowed to set. The mold after "setting" was removed from the glue, dried in air overnight at 150° C., and finally ignited at 800° C. The resultant refractory mold was strong and had smooth surfaces and sharp, clearly defined surface conformations.

Castings were prepared of stainless steels in molds prepared in accordance with the foregoing example. Each steel had chromium and nickel contents respectively of substantially 18% and 8%,—while the silicon content of the steels ranged around 2% and upwardly of 4%. Castings produced by this technique were very sharp and smooth, and free from blowholes. They required almost no buffing or polishing to prepare them for use.

The alumina molds used in the above-mentioned casting operations contained around 5% of silica, deposited from the solution of silicic acid ester, as the bonding agent. This approximate proportion of silica is not essential, although yielding very good results with the kind of alloys recited. Satisfactory molds of course can be produced which contain more or less than this amount of the silica bond.

The refractory molds of the invention also may readily be prepared from impressions of glue, wax or other material, or they can be produced directly from the pattern.

In the above example, the silicic acid ester functions as an impregnating and bonding agent. Generally the amount thereof used is that required to yield with the refractory materials a pasty, homogeneous mass suitable for flowing around the pattern or impression to be copied.

It is however within the scope of the invention to treat and improve molds made by the use of other well known binders, such as tar or molasses. In such instances the mold after shaping and before use generally is surface-coated or has its molding surface impregnated with the silicic acid ester solution which may or may not contain a filler.

The decomposition of the silicic acid ester produces silica which is not in a fused state, and which provides a rigid internal structure of inorganic material having a porosity sufficient to permit free escape therethrough of gases and vapors formed, without injury to or distortion of the mold.

When using the silicic acid ester for surface coating and slightly impregnating the molding surfaces, a more viscous solution than that mentioned above is preferred. This is effected by reducing the amounts of ethanol and water in the above formula. The amount of silica deposited upon the surfaces or within the body of the mold varies, of course, upon the composition and quantity of the solution used.

Where a particularly strong internal or surface mold structure is desired it may be preferable to use the monohydric alcohol silicate solutions. Because of the tendency of the partially hydrolyzed monohydric alcohol silicate solutions to gel upon standing, however, they should be used within a limited time after they are prepared. In certain instances, the use of the monohydric alcohol condensed silicates is preferred because of their lower volatility and relatively high silicon content.

The polyhydric alcohol silicate solutions do not tend to gel upon standing out of contact with hydrolyzing influences. Partial hydrolysis of the polyhydric alcohol silicate solutions is not necessary. Moreover, upon decomposition, the polyhydric alcohol silicate solutions liberate the polyhydric alcohol, which aids in obtaining a clean parting of the casting from the mold; whereas with monohydric and condensed silicate solutions, it is necessary to add a polyhydric alcohol to the solution or to apply the latter separately to the sand molds if this benefit is desired. A mixture of the monohydric and polyhydric alcohol silicate solutions is particularly useful for mold coating.

It is to be understood that esters of other inorganic compounds capable of yielding refractory oxides may, in certain cases, be substituted for the corresponding esters of silicic acids hereinbefore described. Among these may be mentioned the esters of titanium and zirconium.

The molds produced in accordance with the present invention are well adapted for the molding not only of ferrous alloys such as the stainless steels but also of high melting non-ferrous alloys such as "Stellite", "Hastelloy" and many others having wide use in the arts.

It may be desirable in certain instances to use a solution of a mixture of silicates, and it will therefore be understood that the terms "esters of ortho-silicic acid" and "silicic acid esters" in the claims are intended to include either a solution of a single ester or of a mixture of such esters.

I claim:

1. A refractory mold adapted for use with high melting alloys, which comprises a body of comminuted refractory material having a portion thereof shaped to provide a molding surface, at least the portion of the mold near the molding surface containing an ester of an inorganic acid capable of forming a refractory oxide, the said mold being adapted upon heat treatment to provide a porous, rigid body having a smooth, hard, molding surface.

2. A refractory mold adapted for use with high melting alloys, which comprises a body of comminuted refractory material having a portion thereof shaped to form a molding surface containing an organic compound of silicon adapted to produce, upon decomposition, an adherent film of silica at the said molding surface and to yield a porous, rigid structure at points remote from the molding surface.

3. A refractory mold adapted for use with high melting alloys, which comprises a body of a comminuted aluminum-containing refractory material having a portion thereof shaped to provide a molding surface, at least the portion of the mold adjacent the said molding surface containing an ester of an inorganic acid capable upon hydrolysis and subsequent dehydration of forming a refractory oxide, the said mold being adapted, upon heat treatment, to provide a smooth, strong, molding surface backed by a rigid, somewhat porous mold body permitting free escape of volatiles in a direction away from the molding surface.

4. A refractory mold adapted for use with high melting alloys, which comprises a body containing comminuted fused alumina and an alkaline-earth oxide and shaped to provide a molding surface, at least the portion of the mold adjacent the molding surface containing an ester of an inorganic acid capable upon hydrolysis and subsequent dehydration of forming a refractory oxide, to provide a strong, smooth, molding surface backed by a porous, rigid internal structure.

5. A sand mold adapted for use with high melting alloys and having the molding surface rendered smooth and hard by the deposition of adherent unfused silica on the molding surface and in the body of the mold adjacent to the surface.

6. A refractory mold adapted for use with high melting alloys and having a bonding and strengthening agent comprising in major part a decomposition product of a polyhydric alcohol silicate, and a smooth adherent silica film on its molding surface, the said film being relatively hard and strong as compared with the strength and hardness of the adjacent body of refractory to which the said film adheres.

7. A refractory mold as set out in claim 6, in which the said product is derived from a glycol silicate.

8. A refractory mold as set out in claim 6, in which the said product is derived from a glycerol silicate.

9. A refractory mold comprising a bonding and strengthening agent containing a polyhydric alcohol and a powdered refractory material, the said mold having at least adjacent a molding surface thereof a smooth, adherent, silica film formed by the decomposition of an ester of silicic acid.

10. The method of making a casting of high melting metal which comprises forming a mold of a finely-divided refractory material by means of a solution containing an organic compound of silicon capable, upon hydrolysis and subsequent at least partial dehydration, of producing an adherent film of silica, and casting the said metal in the said mold.

11. The method of making a refractory mold, which comprises forming a mold of a refractory mixture containing therein a polyhydric alcohol and a silicic acid ester adapted, upon hydrolysis and subsequent at least partial dehydration, to produce a hard, strong and somewhat porous body containing unfused, adherent silica.

12. The method of making a mold for use in casting high melting metals, which comprises forming a mold of comminuted refractory material, and impregnating at least that portion of the material at and adjacent the molding surface with a solution containing a silicic acid ester of a polyhydric alcohol capable of producing, upon hydrolysis and subsequent dehydration, a smooth, adherent film of unfused silica on the molding surface and of liberating the said polyhydric alcohol.

13. The method of treating casting molds which comprises providing at least at and adjacent the molding surface thereof a glycol and a solution containing a silicic acid ester of a monohydric alcohol capable of producing, upon hydrolysis and dehydration, a smooth, hard film of silica.

14. The method of treating refractory molds, which comprises applying to the molding surface thereof a liquid containing a silicic acid ester of a polyhydric alcohol misciable with water and dissolved in a volatile solvent, and vaporizing the said solvent and decomposing the said ester by hydrolysis and subsequent dehydration, thereby depositing in the mold adjacent the molding surface a smooth, hard film of silica and liberating there the polyhydric alcohol.

15. The method of making a mold for use in casting high melting metals, which comprises forming a mold of comminuted refractory material, impregnating at least that portion of the said material in the vicinity of the molding surface with a solution containing an ester of an inorganic acid capable of forming a refractory oxide, upon hydrolysis and subsequent dehydration, and decomposing the said ester by hydrolysis and subsequent dehydration, thereby producing a smooth film of the said oxide upon the said molding surface.

16. A sand mold having a strengthening and bonding agent containing an at least partially hydrolyzed ester of silicic acid.

17. In the method of making a refractory mold, the steps which comprise slightly acidifying an organic silicate in the presence of water, thereby at least partially hydrolyzing the said silicate, and mixing the resultant product with comminuted refractory material to form a refractory paste.

18. A refractory mold adapted for use with high melting alloys, which comprises a body of comminuted refractory material having a portion thereof shaped to provide a molding surface, at least that portion of the mold near the molding surface containing an at least partially hydrolyzed silicate ester capable of forming a refractory oxide, the said mold being adapted upon heat treatment to provide a porous, rigid body having a smooth, hard, molding surface.

19. A refractory paste for molds, which comprises a comminuted refractory material bonded with an at least partially hydrolized silicic acid ester.

20. A refractory paste for molds, which comprises a comminuted refractory material bonded with a silicic acid ester of a polyhydric alcohol, only part of the hydroxyl ions of the alcohol being esterified.

21. The method of making a settable, highly refractory paste for molds, which consists in treating an organic silicate to initiate spontaneously increasing aggregation of colloidal silica particles, and admixing the resultant material, as a binder, with a highly refractory material of the class which includes silica, alumina, and similar oxides.

22. The method of making a settable, highly refractory paste for molds, which consists in treating an organic silicate to initiate spontaneously increasing aggregation of colloidal silica particles, admixing the resultant material, as a binder, with a highly refractory material of the class which includes silica, alumina, and similar oxides, and adding an accelerating agent to said mixture to speed the setting thereof.

23. The method of making a settable, highly refractory paste for molds, which consists in treating an organic silicate to initiate spontaneously increasing aggregation of colloidal silica particles, admixing the resultant material, as a binder, with a highly refractory material of the class which includes silica, alumina, and similar oxides, and adding magnesium oxide to said mixture as an accelerating agent to speed the setting thereof.

24. The method of making a settable, highly refractory paste for molds, which consists in treating an organic silicate to initiate spontaneously increasing aggregation of colloidal silica particles, admixing the resultant material, as a binder, with a highly refractory material of the class which includes silica, alumina, and similar oxides, and heating said mixture to speed the setting thereof.

25. The method of making a settable, highly refractory paste for molds, which consists in acidifying an organic silicate to initiate spontaneously increasing aggregation of colloidal silica particles, and admixing the resultant material, as a binder, with a highly refractory material of the class which includes silica, alumina, and similar oxides.

26. The method of making a settable, highly refractory paste for molds, which consists in adding water and a trace of an acidifying agent to an organic silicate to initiate hydrolysis of the latter and to initiate a spontaneously increasing aggregation of colloidal silica particles, admixing the resultant material, as a binder, with a highly refractory material of the class which includes silica, alumina, and similar oxides, and incorporating with said mixture a trace of an accelerating agent to speed the setting action.

27. A highly refractory mold composed solely of a main refractory material and binder of silica gel.

28. A highly refractory mold consisting solely of a refractory material of the class which includes silica, alumina, and similar oxides, admixed with a binder of silica gel.

29. A settable, highly refractory paste for molds, composed of a main refractory ingredient, and a liquid binder adapted spontaneously and increasingly to generate pure silica gel.

30. A settable, highly refractory paste for molds, composed mainly of a refractory ingredient of the class which includes silica, alumina, and similar oxides, and a binder consisting of a hydrolyzed, acidified, organic silicate adapted spontaneously and increasingly to generate silica gel.

31. A settable plastic material for molds composed of dry silica admixed with a binder and an accelerating agent for speeding the setting action, the binder consisting of a hydrolyzed, acidified organic silicate adapted spontaneously to form an increasing aggregation of colloidal silica particles.

32. The method of treating a mold or model to increase the firmness and smoothness of its surface, which consists in impregnating the mold model with an organic silicate adapted spontaneously and increasingly to generate silica gel, and then drying it.

ARTHUR B. RAY.